US012795325B2

(12) United States Patent
Lyren

(10) Patent No.: US 12,795,325 B2
(45) **Date of Patent: *Nov. 10, 2026**

(54) DISPLAYING A LOCATION OF BINAURAL SOUND OUTSIDE A FIELD OF VIEW

(71) Applicant: Philip Scott Lyren, Rincon, PR (US)

(72) Inventor: Philip Scott Lyren, Rincon, PR (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/942,838

(22) Filed: Nov. 11, 2024

(65) Prior Publication Data

US 2025/0071506 A1 Feb. 27, 2025

Related U.S. Application Data

(63) Continuation of application No. 18/241,456, filed on Sep. 1, 2023, now Pat. No. 12,143,808, which is a continuation of application No. 17/199,325, filed on Mar. 11, 2021, now Pat. No. 11,751,002, which is a continuation of application No. 16/826,175, filed on Mar. 21, 2020, now Pat. No. 10,952,012, which is a continuation of application No. 16/268,506, filed on Feb. 6, 2019, now Pat. No. 10,602,302.

(51) Int. Cl.

| | |
|---|---|
| ***H04S 7/00*** | (2006.01) |
| ***G02B 27/01*** | (2006.01) |
| ***G06F 3/01*** | (2006.01) |
| ***G06T 19/00*** | (2011.01) |

(52) U.S. Cl.

CPC .............. *H04S 7/40* (2013.01); *G02B 27/017* (2013.01); *G06F 3/011* (2013.01); *G06T 19/003* (2013.01); *H04S 7/304* (2013.01)

(58) Field of Classification Search

CPC . H04S 7/303; H04S 7/40; H04S 7/304; H04S 2400/11; H04S 2420/01; G02B 27/017; G06F 3/011; G06F 3/012; G06T 19/003

USPC .......................................................... 381/310

See application file for complete search history.

(56) References Cited

U.S. PATENT DOCUMENTS

| | | | | |
|---|---|---|---|---|
| 10,602,302 | B1 * | 3/2020 | Lyren | G06F 3/012 |
| 10,952,012 | B2 * | 3/2021 | Lyren | G06F 3/012 |
| 11,751,002 | B2 * | 9/2023 | Lyren | G06F 3/011<br>381/310 |
| 12,143,808 | B2 * | 11/2024 | Lyren | H04S 7/304 |
| 2014/0375683 | A1 * | 12/2014 | Salter | G06F 3/011<br>345/633 |
| 2016/0239252 | A1 * | 8/2016 | Nakagawa | G06F 3/012 |
| 2017/0185148 | A1 * | 6/2017 | Kondo | G06F 3/013 |

* cited by examiner

*Primary Examiner* — Paul Kim

(57) ABSTRACT

A method or apparatus provides binaural sound that originates to a person at a location inside a field of view (FOV) provided to the person by an electronic device. The electronic device determines when the location of the binaural sound moves outside the FOV and assists the person in determining the location of the binaural sound. A display of the electronic device displays a visual indication that shows a direction to the location of the binaural sound outside the FOV.

20 Claims, 8 Drawing Sheets

DISPLAYING A LOCATION OF BINAURAL SOUND OUTSIDE A FIELD OF VIEW

BACKGROUND

Three-dimensional (3D) sound localization offers people a wealth of new technological avenues to not merely communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

Figure 1:
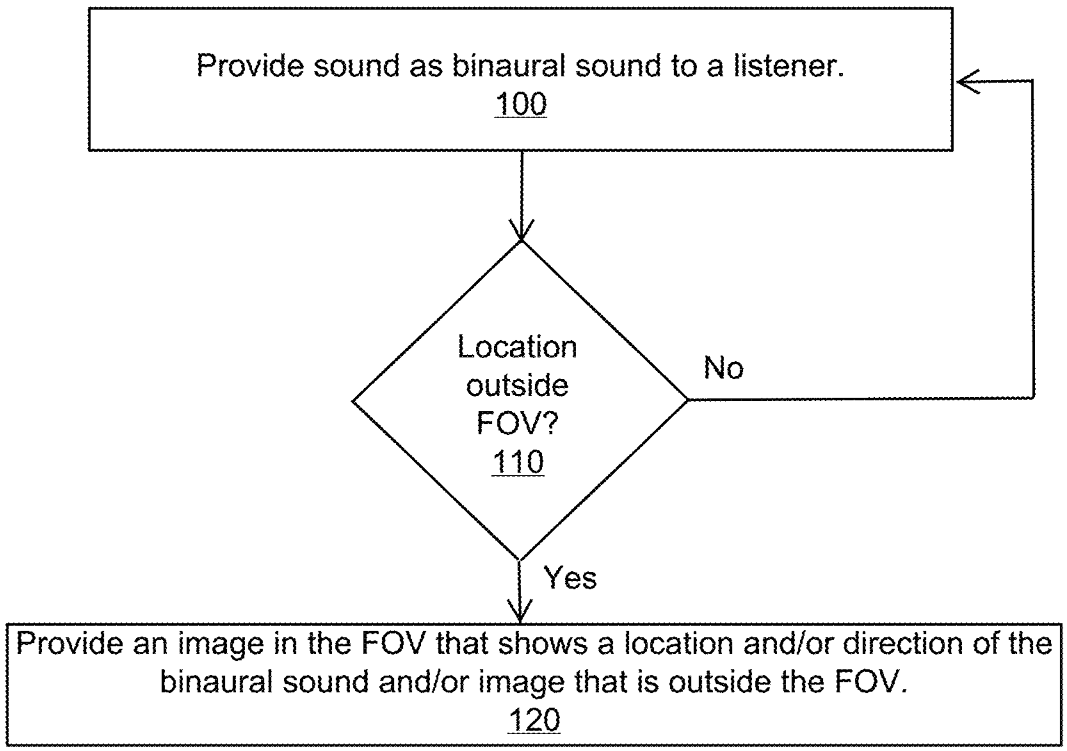
FIG. 1 is a method that displays a location of binaural sound and/or an image that is outside a field of view in accordance with an example embodiment.

Example embodiments include methods and apparatus that display a direction and/or a location of binaural sound that occurs outside a field of view.

One example embodiment is a method or apparatus that provides binaural sound that originates to a person at a location inside a field of view (FOV) provided to the person by an electronic device. The electronic device determines when the location of the binaural sound moves outside the FOV and assists the person in determining the location of the binaural sound. A display of the electronic device displays a visual indication that shows a direction to the location of the binaural sound outside the FOV.

Other example embodiments are discussed herein.

DETAILED DESCRIPTION

Binaural sound or three-dimensional (3D) sound externally localizes away from a head of the listener, unlike stereo or mono sound that localizes inside the head of the listener or localizes to a physical sound speaker. Thus, when a listener hears binaural or 3D sound, a source or location of the sound occurs outside the head of the listener even though this location may be in empty space or space not occupied with a physical sound speaker or loud speaker.

Electronically generated binaural sound has many technical challenges and problems, especially when users exchange binaural sound in an electronic communication or hear binaural sound in an augmented reality (AR) or virtual reality (VR) environment. Example embodiments offer solutions to these challenges and problems.

Problems occur in electronic communications and AR and VR environments that provide binaural or 3D sound when the sound localization point (SLP) of this sound moves outside a field of view (FOV) of the listener or electronic device displaying the FOV to the listener. Problems can also occur when the SLP of the binaural sound is not visible while in the FOV (e.g., a voice that appears in empty space without an associated image or source of sound). When these events occur, the listener may still be able to hear the sound but will not be able to see where the sound is originating (e.g., the listener cannot see the SLP or the source of the sound). As such, the listener may become unaware of a precise location of this sound. Additionally, the listener can become confused as to who or what is generating the sound. These events can occur, for example, when the head of the listener moves with respect to the SLP, when the SLP or source of sound moves with respect to the listener, and/or when the source of sound stops making sound that the listener can hear.

Consider an example in which the listener wears a wearable electronic device (WED) that displays a FOV with a talking graphical image (e.g., an image of talking person, animal, or another sound source). The WED includes or communicates with headphones, earphones, or another electronic device that provide 3D sound to the listener such that this sound externally localizes to the displayed graphical image (e.g., the SLP for the 3D sound occurs at the image). If the listener moves his or her head too far, then the image will no longer be in the FOV of the listener. Additionally, the image can move to a location that is outside the FOV of the listener. In either case, the listener may still be able to hear sound of the image, but he or she will not be able to see the image. As such, the listener may be unable to track or follow the location of the image since it is no longer in the FOV. Even if the image continues to provide sound, the listener may be unable to determine a more precise location of the image since it may be behind the listener and moving. Further yet, the listener and/or the environment may be changing or moving causing further difficulty in determining a location of the image and/or the source of sound.

Further problems and technical challenges exist as well. For example, even though listeners can localize binaural sound, localization to a specific location can be difficult in some instances. Listeners can become confused as to where the source of sound exists, especially if the source of sound and/or head of the listener moves. Difficulties in localizing binaural sound arise when the SLP occurs behind the listener, when the SLP has no accompanying image (e.g., a voice in empty space with no viewable image), when the SLP is far away from the listener, when the SLP is obstructed or obscured from view, when the FOV is dark, and when the SLP and/or listener moves while the SLP is outside the FOV or not visible inside the FOV.

Example embodiments solve these problems and others. These example embodiments include methods and apparatus that assist the listener in locating an image and/or SLP of binaural sound that occurs inside or outside a FOV of the listener. For example, an electronic device displays or provides the listener with information about the location and/or direction of the image and/or SLP. This information helps the listener track or locate the image and/or SLP. This information also helps the listener distinguish between multiple 3D sounds that concurrently or simultaneously occur outside and inside the FOV.

FIG. 1 is a method that displays a location of binaural sound and/or an image that is outside a field of view in accordance with an example embodiment.

Block 100 states provide sound as binaural sound to a listener.

An electronic device provides binaural or 3D sound to the listener such that the source of the sound or the sound localization point (SLP) originates outside the head of the listener. In an example embodiment, this location occurs inside a field of view (FOV) of the listener and/or an electronic device (e.g., a wearable electronic device that the listener wears). Alternatively, this location occurs outside a FOV of the listener and/or electronic device.

Consider an example in which the listener wears a wearable electronic device (WED), such as a head mounted display (HMD) that provides virtual reality (VR) images or electronic glasses that provide augmented reality (AR) images. The WED displays a VR or AR image that talks or generates sound. This sound emanates from or originates from the VR or AR image as binaural sound or 3D sound (sometimes referred to as spatial audio). The SLP occurs at the image that is displayed in a FOV of the listener. In this example, both the image and the SLP are in the FOV of the listener. The listener sees the image thru or with the WED, and the SLP where the listener hears the sound originates from a location in the FOV. In this example, the SLP originates at the image being displayed.

Examples embodiment includes instances in which the SLP includes a graphical representation or image and instances in which the SLP does not. For example, a WED simultaneously provides an image and binaural or 3D sound that originates from this image. As another example, the WED provides binaural or 3D without an image. As one example, a voice originates at a SLP inside a FOV of the listener, but the voice is not accompanied with an image or such an image is not viewable. As another example, the voice originates at a SLP outside the FOV of the listener (e.g., the voice originates behind, above, or below a head of the listener). As another example, a voice or sound originates in the dark, or the listener is not capable or able to see or discern the image.

Consider a further example in which the electronic device displays or provides a FOV to the listener, and this FOV includes a source of sound or SLP from which binaural sound originates. The source of sound or SLP may or may not be visible to the listener. The SLP can originate from a location in the FOV that does not include an image of the source of sound. For example, a voice appears to originate in unoccupied or empty space in front of the listener or appears to originate behind a door. The source of sound or SLP can also be visible. For example, the voice originates from a talking person or animated object that moves in the FOV of the listener as a 2D object, 3D object, AR object, VR object, or hologram.

Binaural sound is provided to the listener through one or more electronic devices including, but not limited to, one or more of headphones, earphones, earbuds, bone conduction devices, or other electronic devices with speakers at, in, or near the ears of the listener. Binaural sound can be processed for crosstalk cancellation and provided through speakers separate or away from the listener (e.g., dipole stereo speakers). Electronic devices in communication with or formed as part of headphones, earphones, and earbuds can provide binaural sound to the listener (e.g., a smartphone in wireless communication with earphones).

Various types of electronic devices can include or be in communication with speakers to provide binaural sound to listeners. Examples of these electronic devices include, but are not limited to, wearable electronic glasses, smartphones, head mounted displays (HMDs), optical head mounted displays (OHMDs), wearable electronic devices (WEDs), portable electronic devices (PEDs), handheld portable electronic devices (HPEDs), laptop computers, tablet computers, desktop computers, and other electronic devices.

From the point-of-view of the listener, the sound originates or emanates from an object, point, area, or direction. This location for the origin of the sound is the sound localization point (SLP). By way of example, the SLP can be an actual point in space (e.g., an empty point in space 1-2 meters away from the head of the listener) or a point on or at a physical or virtual object (e.g., a mouth or head of an augmented reality (AR) or virtual reality (VR) image). The SLP does not have to be so precise since humans are not always able to localize sound to a particle point. As such, the SLP can also be a specific or general area (e.g., a location next to and on the right side of the listener) or a specific or general direction from where the sound originates to the listener (e.g., a location several meters behind the listener).

When binaural sound is provided to the listener, the listener will hear the sound as if it originates from the sound source, the source of sound, or the SLP. The sound, however, does not originate from the sound source since the sound source or SLP may be an inanimate object with no electronics or an animate object with no electronics. Alternatively, the sound source or SLP has electronics but does not have the capability to generate sound (e.g., the sound source has no speakers or sound system). As yet another example, the sound source or SLP has speakers and the ability to provide sound but is not providing sound to the listener. In each of these examples, the listener perceives the sound to originate from the sound source or SLP, but the sound source or SLP does not produce the sound. Instead, the sound is processed or convolved and provided to the listener so the sound appears to originate from the sound source or SLP.

Consider an example in which the sound externally localizes away from the head of the listener in empty space (e.g., where no physical or tangible object exists) or occupied space. For example, the sound externally localizes proximate or near the listener, such as localizing within a few meters of the listener. For instance, the SLP where the listener localizes the sound is stationary or fixed in space (e.g., fixed in space with respect to the user, fixed in space with respect to an object in a room, fixed in space with respect to an electronic device, fixed in space with respect to another object or person).

One or more processors process and/or convolve the sound so the sound originates or emanates to the listener from a SLP that is in the field-of-view (FOV) of the listener. As noted, this SLP can include an image (such as a 2D or 3D image), a picture, AR image, VR image, hologram, video, text, symbol, graphical representation, icon, emoji, etc. The SLP can also occur in empty space where no physical or tangible object resides.

Consider an example in which the two users communicate with each other while wearing head mounted displays or wearable electronic devices. These electronic devices execute software that enables voice exchanges between the two users. For example, the electronic devices execute a voice messaging application that includes voice exchange, sending graphical representations with binaural sound, messaging, etc. The voice of the second user originates to the first user from a SLP that includes an image representing the second user. In this way, the first user sees the second user and also hears the voice originating from this image. The image and thus SLP are in the field-of-view of the first user since the first user sees the image from where the sound emanates.

Block 110 makes a determination whether the location of the binaural sound and/or image is outside the FOV.

In an example embodiment, the electronic device determines, detects, and/or tracks a location of the SLP, binaural sound, and/or image. These locations include inside and outside the FOV of the listener, display, and/or electronic device.

Consider an example in which the listener wears a WED that displays a FOV to the listener. The WED tracks the SLP and/or image and detects when the SLP and/or image moves outside the FOV being provided to the listener.

An example embodiment executes head tracking to track head movement of the listener while the listener listens to the sound. Head tracking monitors or tracks head position and/or orientation of the head of the listener. Various methods and electronics can be used to track head movement. By way of example, such electronics include, but are not limited to, one or more of accelerometers, gyroscopes, magnetometers, cameras, and infrared LEDs.

For example, head tracking or gaze tracking detects when a listener is looking at a particular direction, location, object, or area. As another example, a camera and facial recognition determine where the listener is looking. As another example, one or more sensors (e.g., in an Internet of things, IoT environment) detect when the listener moves into the area or location. Proximity sensors and radio frequency identification (RFID) tags can also track objects, such as the user and electronic devices.

An example embodiment also tracks a location of the SLP and/or an object associated with the SLP. For example, the SLP occurs at a coordinate location associated with the coordinates of head-related transfer functions (HRTFs) convolving or processing the sound being provided to the listener. As another example, the SLP occurs at a coordinate location on or thru a display that includes an object at the SLP. For instance, the SLP is or includes a talking graphical representation, such as a talking emoji, animoji, emoticon, person, character, image, etc., and this location is known from the pixel coordinates illuminating the graphical representation. As yet another example, the SLP can occur at a location of a physical or tangible object, such as sound externally localizing to a physical object proximate to the listener (e.g., a person with a smartphone or object with trackable tag).

Consider an example in which an electronic device processes sound and provides this sound as binaural sound that externally localizes to a SLP to the listener. A DSP processes HRTFs with coordinate location (2.0 m, 135°, 25°) so that the sound localizes to this SLP. This location, however, is outside the FOV. The listener hears the sound as originating behind his or her head and current head orientation. The location and direction of the source of sound is known to the electronic device from the coordinates in the HRTFs processing the sound. With this location information, the electronic device displays a visual indication showing where the SLP exists with respect to the current FOV of the listener. In this instance, the display of the electronic device directs the listener to (2.0 m, 135°, 25°).

Consider an example embodiment that tracks a location of an object inside or outside the FOV based on detecting different arrival times of sound at two spaced apart microphones. For example, a WED (such as headphones, HMD, or wearable electronic glasses) includes two spaced apart microphones located at or near the ears of the user (e.g., a first microphone located on, at, or near a left ear and a second microphone located on, at, or near a right ear). These two microphones capture or record sound (e.g., sound of a talking person) while the wearer wears the WED. A difference in arrival time of sound at the two microphones provides information with regard to the azimuth angle of the source of sound with respect to the user.

Consider an example in the listener wears a head mounted display, electronic glasses, or other wearable electronic device that displays a field-of-view to the listener. Initially, the SLP occurs in this field-of-view. For example, the wearable electronic device includes a display or displays an image or graphical representation with or at the SLP. This SLP and graphical representation can remain at a fixed location in this field-of-view such that head movements of the listener cause the SLP and graphical representation to leave the field-of-view of the listener. For instance, the SLP and graphical representation are visible since they appear within several meters in front of the listener. When the listener turns or rotates her head 180° (e.g., turning to look behind her), the field-of-view no longer includes the location of the SLP and graphical representation. Further, the SLP and graphical representation can move even though the head of the listener remains fixed or stationary. For instance, while a head of the listener remains motionless in a forward-looking direction, the SLP and accompanying graphical representation disappear and are no longer visible to the listener (e.g., they move behind the listener or off to one side).

Humans have a visual field that includes about 210° per a forward-facing horizontal range and about 150° in the vertical range. Further, the ability to perceive or to identify shape and motion across the visual field varies.

Example embodiments are not limited to executing within a full field-of-view or visual field of the listener but include subsets or smaller areas within the field-of-view or visual field. For example, a listener may have a field-of-view that extends 180° horizontally and 150° vertically, but a subset of this FOV is limited to 120° horizontally and 90° vertically. Example embodiments can execute in such subsets. For example, the listener moves his or her head, and this movement causes the SLP to move outside the subset of the FOV or visual field but remains in the full FOV. Movement of the SLP outside the subset of the FOV initiates a tracking and/or displaying of the location of the SLP to the user as discussed herein.

An example embodiment tracks the location of the SLP and/or image based on coordinate locations derived from the head movements, the SLP, the image, and/or transfer functions processing the sound. The SLP and/or image can be fixed with respect to the listener or moving. For example, the SLP is derived or determined from a coordinate location of the HRTFs processing the sound. Pixel locations from a display also provide coordinate or location information (e.g., a location or area on the display where the graphical representation and SLP are provided to the listener).

Consider an example in which a display of the electronic device displays a VR or AR image, and headphones or earphones play 3D sound that originates from this image.

The display of the electronic device provides the FOV to the wearer or listener. The image and SLP occur at coordinate locations of the pixels of the display displaying the image to the listener. This image and SLP can move or become located outside the FOV being displayed to the listener. For example, the image moves to a location off or outside of the display. For instance, in a VR environment, the image moves behind the listener. Alternatively, the listener moves his or her head, and this movement causes the location of the image to be outside of the current FOV being displayed.

If the answer to the determination in block 110 is "no" then flow proceeds back to block 100.

If the answer to the determination in block 110 is "yes" then flow proceeds to block 120 that states provide an image in the FOV that shows a location and/or direction of the binaural sound and/or image that is outside the FOV.

Consider an example in which an electronic device initially provides a user with a SLP for 3D sound and/or an image (e.g., a VR or AR image). The sound and/or image subsequently moves outside the FOV of the electronic device or listener, and the listener may be unaware of the location of the sound and/or image. An example embodiment assists the person in finding a location and/or direction of binaural sound and/or image that is outside this FOV. The electronic device displays a visual indication or an image that shows the listener a direction and/or location of the sound and/or image. For example, the visual indication or image includes information that instructs or shows the listener where to look or where to move the electronic device toward a particular direction. Movement in this direction causes the location of the sound and/or image to reappear in the FOV.

This information can also assist the listener in knowing or remembering where objects are located outside the FOV. Consider an example in which several sound sources are outside a FOV of the listener. Sound originates from these sources as 3D sound (e.g., several people, animals, or objects are located behind the head of the listener, outside the FOV, or otherwise not visible). The electronic device displays a separate image for each sound source. Each image is placed on the display to show the location and/or direction of its respective sound source. When 3D sound originates from one of these sound sources, the display assists the listener in knowing which source is originating the sound. For example, the listener hears a voice of Alice originating outside the listener's FOV and from a right side of his head. The electronic device displaying the FOV displays a small image of Alice on the right side of the FOV. Without moving his head, the listener can readily see the image of Alice in a direction or location of the FOV that aligns with the SLP from where the listener heard the voice. The listener knows that the voice belongs to Alice and the location of this voice based on the information being displayed.

Consider an example in which the electronic device displays a visual indication or image at a perimeter of the FOV. This image and/or its particular location at the perimeter notifies or informs the listener of the location of the SLP and/or image outside the FOV. Movement of the electronic device toward the location of the image at the perimeter causes the SLP and/or image to occur back inside the FOV of the electronic device and/or listener. Here, movement of the electronic device in a direction of the location of the perimeter where the image exists changes the FOV to include the SLP and/or image outside the FOV.

The image or visual indication can show the direction and/or location of the SLP and/or image in a variety of ways that include, but are not limited to, displaying words, text, symbols, or other indicia providing the direction and/or location, playing audio content (including stereo, mono, or binaural sound) providing the direction and/or location, displaying the image to include pictures, video, graphical representations, AR images, or VR images providing the direction and/or location, and displaying the image at a location in the FOV or on the display providing the direction and/or location.

Consider the following example embodiments that display the visual indication or the image at a location in the FOV or on the display that provides the listener with the direction and/or location of the SLP and/or image outside the FOV.

As one example, an example embodiment divides the display and/or FOV into different sections or areas (e.g., two sections, three sections, four sections, five sections, six sections, etc.). Each section corresponds to a direction and/or location of the SLP and/or image that is outside the FOV. For example, the display or FOV is divided into four sections: top, bottom, left, and right. A location of the image occurs at the section corresponding to the closest or nearest direction and/or location of the SLP and/or image. When the SLP and/or image is located outside and above the FOV, display the image in the top section of the display or FOV. The location of the image in this section informs the listener that the SLP and/or image is above the FOV. When the SLP and/or image is located outside and below the FOV, display the image in the bottom section of the display or FOV. The location of the image in this section informs the listener that the SLP and/or image is below the FOV. When the SLP and/or image is located outside and to the right of the FOV, display the image in the right section of the display or FOV. The location of the image in this section informs the listener that the SLP and/or image is to the right of the FOV. When the SLP and/or image is located outside and to the left of the FOV, display the image in the left section of the display or FOV. The location of the image in this section informs the listener that the SLP and/or image is to the left of the FOV.

As another example, an example embodiment divides the periphery or edge of the FOV of the display into a plurality of sections or areas. Each section or area corresponds to a direction and/or location of the SLP and/image that is outside the FOV. Consider an example in which the display provides a FOV with a circular or elliptical shape. A region along the edge or periphery of this display is divided into multiple segments or sections (e.g., 10 sections, 20 sections, 30 sections, etc.). Each section in the periphery inside the FOV is adjacent to a corresponding section outside the FOV. The image appears in a particular section of the perimeter or periphery of the display, and this location signifies to the listener that the SLP and/or image is next to or adjacent to this section of the display. This location at the periphery of the FOV also shows the direction for where to look to find the SLP and/or image.

For illustration, consider an example in which the display or FOV is divided, sectioned, partitioned, or segmented like a clock. Here, twelve o'clock signifies the SLP and/or image is above the FOV; three o'clock signifies the SLP and/or image is to the right of the FOV; six o'clock signifies the SLP and/or image is below the FOV; and nine o'clock signifies the SLP and/or image is to the left of the FOV. A light along the periphery at a location of two o'clock flashes or illuminates. This location informs the listener to move his or her head in the direction of two o'clock. The SLP and/or image is located outside the FOV in a direction or location somewhere along the two o'clock direction. When the listener moves his or her head in this direction, the FOV changes and captures the SLP and/or image that was previously outside the FOV.

Consider an example in which the display of the electronic device displays multiple different images at different locations at the perimeter of the FOV. A location of each of the multiple images at the perimeter provides the listener with a direction of where to look to move the FOV to include the SLPs and/or objects located outside the FOV.

Consider an example embodiment in which the display of the electronic device displays the visual indication or the image at a location at the perimeter. Movement of the electronic device and/or head of the listener toward this location at the periphery moves the FOV in a direction that captures the location of the binaural sound back inside the FOV provided to the person by the electronic device. This image may be flashing or illuminated light, an arrow, a word, directions or instructions, or a form of visible indicia directing the listener to move the FOV in the indicated direction if the listener desires to capture or include the SLP and/or image that is currently outside the FOV. For example, the electronic device flashes or illuminates a location on the perimeter or away from the perimeter to notify the listener to move his or her head orientation toward the location flashing or illuminating to move the FOV to include the SLP.

Consider an example embodiment in which the FOV or display includes a plurality of imaginary lines that radiate outwardly from an origin or center (e.g., a center of the FOV or a location of the listener). These imaginary lines point to directions and/or locations outside the FOV. These imaginary lines also provide a direction or location for how the listener should move the electronic device and/or his or her head to include the SLP and/or image outside the FOV. 3. For example, the display provides a visual indication (e.g. an image or light) at a location at the perimeter such that the location of the binaural sound outside the FOV exists on an imaginary line that extends from a center of the FOV thru the image. For instance, the location of the SLP outside the FOV occurs on an imaginary line that extends thru a center of the FOV and a location of image at the perimeter.

The visual indication or image can display for different amounts or durations of time (e.g., continuously, continually, periodically, or for a specific amount of time). For example, when the SLP and/or image moves or reappears back inside the FOV, then the electronic device removes the visual indication from being displayed. For instance, an example embodiment detects when the location of the binaural sound moves back inside the FOV provided to the person. The example embodiment then removes the visual indication from being displayed in response to detecting that the location of the binaural sound moved back inside the FOV.

One problem exists in that users can be confused as to what images are being displayed to provide a location of SLPs and/or objects outside the FOV and what images are being displayed as part of the environment in the FOV. For example, in a VR or AR environment, how can the viewer determine whether an image is being displayed as part of that environment or being displayed for direction and/or location information for SLPs and/or objects outside the FOV?

Example embodiments offer various solutions to this problem.

As one example, the visual indication or image being displayed to provide location of SLPs and/or objects outside the FOV is visually distinguished from other images being displayed. For example, display this image with a different color, brightness, or other visual characteristic that distinguishes it from other images in the environment. As another example, display this image as a different or unique object or with a different size and/or shape that does not otherwise appear in the environment. For example, the electronic device signals to the person that the image shows the location of the binaural sound by displaying the image in one of a round, a rectangular, and a square window or box.

As another example solution to the problem, the image being displayed to provide a location of SLPs and/or objects outside the FOV is positioned on the display or in the FOV at a location that distinguishes the image from other images being displayed. The location in the FOV or in the display informs the viewer that the information contained there is directed to providing a location of SLPs and/or objects outside the FOV. For example, display this image at, near, or along the border or periphery of the display and/or FOV. The listener is aware that this area is reserved or designated for such images.

As another example solution to the problem, the image being displayed to provide a location of SLPs and/or objects outside the FOV is a smaller version of the object that is outside the FOV. This smaller version copies, replicates, simulates, emulates, or approximates the object. For example, the smaller version is similar enough to the object that the viewer is aware that the smaller version represents or signifies the object outside the FOV.

The visual indication or image being displayed to provide a location of SLPs and/or objects outside the FOV can also change size and/or shape to indicate movement of the SLP and/or object and/or distances to and from the SLP and/or object. For example, the electronic device reduces a size of the visual indication in response to the location of the SLP moving farther away from the FOV and increases the size of the visual indication in response to the location of the SLP moving closer to the FOV.

Consider an example in which an electronic device displays an image of a talking object (e.g., person, animal, character, or thing). The listener hears sound or voice from this talking object as binaural sound while the location of the binaural sound is inside the FOV. The talking object then disappears from the display or FOV (e.g., the VR environment changes such that the talking object is no longer in the FOV of the listener). At this time, the talking object still exists in the environment but is outside the FOV. To show the direction and/or location of the talking object, the electronic device displays a smaller version of the talking object at a perimeter of the display and/or FOV. Movement of the FOV in this direction recaptures the talking object.

Consider an example in which two people wear WEDs and have an electronic communication in a VR or AR environment. Voices of each person originate as 3D or binaural sound. The first person sees an AR or VR image of the second person, and the second person sees an AR or VR image of the first person. During the electronic communication, the first person moves his head such that the AR or VR image of the second person is no longer in the FOV of the first person. When this action occurs, the WED of the first person displays a smaller version of the AR or VR image of the second person. This image appears near or on an edge of the FOV thru the WED. In this way, the display reminds the first person that the electronic communication is still occurring and also shows the first person in which direction to look to see the AR or VR image of the second person. This visual indication also reminds the first person that sound from this direction outside the FOV is from the second person even though the second person and the voice occur outside the FOV.

The visual indication or image at the periphery can stay for a predetermined amount of time (e.g., as long as the talking object is within a proximity or vicinity of the listener and outside the FOV). Alternatively, appearance or disappearance of the visual indication or image is based on the occurrence of an event, instruction, or command. For example, the electronic device receives a verbal instruction to show the location of the binaural sound that moved outside the FOV. In response to receiving the verbal instruction, the electronic device displays the visual indication at the perimeter of the FOV that shows the direction to the location of the binaural sound that moved outside the FOV.

In an example embodiment, the visual indication or image being displayed to provide a location of SLPs and/or objects outside the FOV tracks and/or moves corresponding to movements of the SLPs and/or objects outside the FOV. For example, when a location of the SLP and/or image outside the FOV changes, the location of the image in the FOV showing this location also changes. Additionally, coordinate locations of the binaural sound change during convolution of the sound with HRTFs as the SLP moves with respect to the listener.

Consider an example electronic device that displays an image or other visual indication along a periphery of the display or FOV to show a direction and/or location of an SLP and/or object outside the FOV. The location of this image along the periphery changes in real time shows the corresponding direction and/or location of the SLP and/or object outside the FOV. For example, the electronic device includes head tracking or motion sensors that sense and/or track movement of the listener and/or wearable electronic device. These movements result in a change in the FOV and hence change in relative location for the SLP and/or object outside the FOV.

Consider an example in which the electronic device tracks the location of the binaural sound and/or object outside the FOV. For instance, this location is derived from coordinate locations in HRTFs being used to process or convolve the 3D sound being provided to the listener. The electronic device displays an image at, near, or along the periphery of the FOV to show the direction and/or location of the SLP and/or object outside the FOV. The location of this image moves along the perimeter to track movements of the location of the binaural sound such that the image continues to show in real time the direction to the location of the binaural sound outside the FOV while the location of the binaural sound outside the FOV moves.

By way of example, a determination to display the visual indication or image providing the location and/or direction of the SLP and/or object outside the FOV includes, but is not limited to, one or more of the following: an instruction or command from a user or listener (e.g., the listener interacts with a user interface to display the image), a sensor sensing of an action (e.g., a sensor senses donning a WED), activation of a physical or virtual switch (e.g., a switch toggles, activates, or moves to display or remove the image), head tracking activates switching (e.g., display or remove the image when the listener moves his or her head a certain amount or to a certain view), a user interface receives a voice command to display or remove the image, a timer or clock initiates displaying or removing of the image (e.g., display for a predetermined number of seconds), a global positioning system (GPS) or Internet of Things (IoT) location activates display or removal of the image (e.g., display the image when the listener enters a predetermined area or location), user preferences indicate when to display and remove the image (e.g., memory stores a user's preference to display the image during telephone calls when the SLP moves outside the FOV), a user agent initiates displaying and removing of the image, a software program causes displaying and removing of the image (e.g., while playing a software game a user takes an action that causes the game to display the image), and other examples discussed herein.

Consider an example in which an electronic device tracks eye movement, focus, or gaze of the listener. The image showing the location of the SLP activates based on the eye movements or gaze. For example, display the visual indication or image when eyes of the listener focus on a particular object or area.

Consider an example in which the listener wears an HMD while playing a VR card game or another game in a virtual environment. In this virtual environment, for example, the listener sits at a blackjack or poker table with other people also present at the table (e.g., a dealer and other players). Voice of these other people externally localize to the listener as binaural sound to the respective images seated around the table. While the table and/or people remain in the field-of-view of the listener, the voices continue to externally localize as binaural sound. The listener then turns his or her head such that the table and/or the other people are no longer in the field-of-view of the listener. This movement causes the HMD to display images along a periphery of the FOV. Each image represents one of the other players and shows their direction and/or location outside the FOV. The listener still hears the voices of the people (or other sounds associated with the game), but the images of the other players are gone since they are no longer in the FOV. While the table and/or people remain out of the field-of-view of the listener, the display continues to show small images of the players at their respective locations at the periphery. When the listener moves his or her head such that the table and/or people re-appear in the field-of-view, the small images at the periphery disappear and the larger versions of the players reappear.

Consider an example in which the visual indication or image occurs within a specific or designated area or a boundary of the display or FOV. For example, this area is defined according a geometric shape that occurs in 2D or 3D space (e.g., a circle, sphere, oval, square, etc.). As another example, this area is defined according to a perimeter or boundary of a display. For instance, a perimeter or edge of AR glasses or HMD define an area in which the image occurs. As another example, a display shows the image with a visibly perceivable indication (e.g., with the use of color, shading, brightness, words, symbols, etc.). When the SLP and/or its coordinate location moves outside of this area or boundary, then an example embodiment executes displaying of the direction and/or location to the SLP.

By way of example, an example embodiment defines an area inside an outer perimeter (e.g., a perimeter of a display, a FOV, or an object). A coordinate location of the SLP occurs inside or within the perimeter. When movements of the head of the listener and/or the SLP cause the coordinate location of the SLP to move outside the perimeter, then this action executes displaying of the direction and/or location to the SLP outside the FOV.

Consider an example in which a user wears electronic glasses that display an AR image of a talking person located on a physical chair in front of the listener. An edge or perimeter of the glasses defines a field-of-view of the listener. A voice of the talking person emanates from the image and represents the SLP to the listener. The glasses include a camera that captures an image of the chair, and object recognition software tracks the location of the chair in order to maintain the AR image of the talking person at this location. When the head of the listener sufficiently rotates in one or more directions, the chair and accompanying AR image are no longer visible in the FOV thru the glasses. Here, the SLP moved outside the perimeter of the FOV. In response to detecting this occurrence, software providing the sound and AR images displays an image at a predetermined location notifying the listener of the direction and/or location of the chair, AR image, and/or SLP. When the head of the listener rotates back so that the chair is within the FOV, the software removes the image providing this information since it is no longer necessary.

Consider an example in which a SLP and accompanying image occur directly in front of a face of a person along a forward-looking line of sight. This line of sight extends as a straight line from the listener's eyes to the SLP and image. A location of the SLP and image along the line of sight define a coordinate location (e.g., with polar or spherical coordinates). Head tracking and/or object recognition software enables an example embodiment to determine how much a coordinate location of the SLP moves with respect to a line-of-sight of the listener while the head of the listener moves. When movement of the coordinate location of the SLP with respect to the line-of-sight exceeds a threshold, then the electronic device displays the image showing the direction and/or location of the SLP.

Consider further this example in which the SLP is directly in front of the listener along the forward-looking line of sight. For example, a location of the SLP is 1.5 meters away and hence has spherical coordinates of (1.5 m, 0, 0). An example embodiment is set to execute displaying the image showing the direction and/or location when a head of the listener rotates more than a threshold amount (e.g., 49° in the azimuth direction). A head of the listener rotates along the horizontal plane or azimuth direction by 50° toward a right side of the listener. Here, the distance (1.5 m) and elevation angle (0) remain unchanged, but the azimuth angle changed by fifty degrees, which is larger than the threshold amount. Since this change in azimuth angle of fifty degrees exceeded the threshold value, the example embodiment displays an image showing the listener that the SLP is located 50° toward a left side of the listener. Displaying this information occurs even though the SLP is still within the FOV of the listener. This change notifies to the listener that the SLP is no longer in a predetermined range of the line of sight.

Consider an example in which the listener simultaneously talks to three different images of people A, B, and C who are located 2 meters in front of the listener. A is located at (2.0 m, −45°, 0); B is located at (2.0 m, 0, 0); and C is located at (2.0 m, 45°, 0). All three images simultaneously occur within the FOV of the listener. When the listener rotates his or her head to look directly at A, an image of C is no longer in the FOV of the listener. This causes a small image of C to appear in the display on a left periphery. The small image indicates that C is outside the FOV and where C is located with respect to the current FOV of the listener.

An example embodiment displays the image showing the direction and/or location of the SLP and/or image when a line-of-sight of the listener moves more than or equal to threshold amount or predetermined amount. For example, display and/or remove the image upon detecting or determining that the line-of-sight of the listener moves more than a predetermined amount in the azimuth and/or elevation direction. Examples of predetermined amounts include, but are not limited to, 10°, 20°, 30°, 40°, 50°, 60°, 70°, 80°, 90°, . . . 180° in the azimuth and/or elevation directions.

An example embodiment displays and/or removes the image when a line-of-sight of the listener moves more than or equal to a specific direction. For example, display and/or remove the image upon detecting or determining that the line-of-sight of the listener moves with a certain compass heading.

Consider an example of a wearable electronic device with a display that displays an image of a person at an SLP that remains at a fixed location to the listener while a head of the listener moves. One or more processors execute instructions to determine when the image of the person is no longer being displayed in the field-of-view of the listener and to display a visual indication notifying the listener of this location outside the FOV.

An example embodiment notifies the listener of the location and/or direction of the SLP and a graphical representation accompanying the SLP. For example, the display displays a visual indication that points to or provides a location to the SLP. This visual indication can appear on or near the perimeter of the field-of-view. For instance, an arrow or other pointing symbol located near the perimeter points to a direction or location of the SLP. In this way, the listener knows which way to turn his or her head so the SLP appears in the FOV. As another example, the display displays a light along a perimeter of the display to inform the listener of the SLP when the SLP is outside the field-of-view of the listener. When the listener moves his or her head in the direction of the light, the SLP appears or reappears in the FOV (e.g., the image reappears in the display) since this area, space, or environment returned back to being in the FOV of the listener.

Consider an example embodiment in which the listener interacts with the user interface to activate and/or deactivate tracking and displaying of the SLP and/or image outside the FOV. For example, the listener interacts with a dropdown menu, mouse, keypad, trackpad, display, or other interface or electronic device. The listener can also execute commands to activate and deactivate tracking and displaying via hand gestures, head movements, eye movements, and other types of body movement.

Consider an example in which the listener wears an HMD or AR glasses that provide 3D sound. When the listener speaks the words "show Alice" to a natural language user interface, the WED displays a visual indication that shows the location and/or direction of Alice who is currently out of the FOV.

The listener can select to activate and deactivate tracking and displaying of the SLP and/or image outside the FOV in other ways as well. Consider an example in which the user plays an AR or VR game that includes shooting objects with a gun. The game provides various 3D objects that include other players in the game. A perimeter of the displayed area or FOV displays a "Locate Players" indication. When the user points and shoots the gun to this indication, the electronic device displays the location of the other players that are outside the FOV of the user via a visual indication.

This example of an AR or VR game shows that the user is able to activate tracking and displaying of the SLP and/or image outside the FOV without disrupting the game. The user interface for taking these functions appears in the game itself. As such, the user can activate and deactivate these functions while continuing to enjoy the game.

Instead of shooting at the visual indication, the user can activate tracking and displaying of the SLP and/or image outside the FOV in other ways depending on the game (e.g., throwing an object at the indication, hitting the indication, shooting an arrow or other projectile at the indication, etc.).

One or more processors or processing unit can convolve or process sound to provide this sound as 3D sound or binaural sound. For example, a processor (such as a DSP) processes or convolves the sound with one or more of head-related transfer functions (HRTFs), head-related impulse responses (HRIRs), room impulse responses (RIRs), room transfer functions (RTFs), binaural room impulse responses (BRIRs), binaural room transfer functions (BRTFS), interaural time delays (ITDs), interaural level differences (ITDs), and a sound impulse response.

Sound includes, but is not limited to, one or more of stereo sound, mono sound, binaural sound, computer-generated sound, sound captured with microphones, and other sound. Furthermore, sound includes different types including, but not limited to, music, background sound or background noise, human voice, computer-generated voice, and other naturally occurring or computer-generated sound.

When the sound is recorded or generated in mono sound or stereo sound, convolution changes the sound to binaural sound. For example, one or more microphones record a human person speaking in mono sound or stereo sound, and a processor processes this sound with filters to change the sound into binaural sound.

The processor or sound hardware processing or convolving the sound can be located in one or more electronic devices or computers including, but not limited to, headphones, smartphones, tablet computers, electronic speakers, head mounted displays (HMDs), optical head mounted displays (OHMDs), electronic glasses (e.g., glasses that provide augmented reality (AR)), servers, portable electronic devices (PEDs), handheld portable electronic devices (HPEDs), wearable electronic devices (WEDs), and other portable and non-portable electronic devices. These electronic devices can also be used to execute example embodiments.

For example, a DSP processes or convolves stereo sound or mono sound with a process known as binaural synthesis or binaural processing to provide the sound with sound localization cues (ILD, ITD, and/or HRTFs) so the listener externally localizes the sound as binaural sound or 3D sound. Other technologies exist as well to provide 3D sound to listeners.

An example embodiment models the HRTFs with one or more filters, such as a digital filter, a finite impulse response (FIR) filter, an infinite impulse response (IIR) filter, etc. Further, an ITD can be modeled as a separate delay line.

When the binaural sound is not captured (e.g., on a dummy head or human head), the captured sound is convolved with sound localization information (SLI). This information includes one or more of HRTFs, HRIRs, BRTFs, BRIRs, ILDs, ITDs, and/or other information discussed herein. By way of example, SLI are retrieved, obtained, or received from memory, a database, a file, an electronic device (such as a server, cloud-based storage, or another electronic device in the computer system or in communication with a PED providing the sound to the user through one or more networks), etc. Instead of being retrieved from memory, this information can also be calculated in real-time.

A central processing unit (CPU), processor (such as a DSP), or microprocessor processes and/or convolves the sound with the SLI, such as a pair of head related transfer functions (HRTFs), ITDs, and/or ILDs so that the sound will localize to a zone, area, or sound localization point (SLP). For example, the sound localizes to a specific point (e.g., localizing to point (r, θ, ϕ)) or a general location or area (e.g., localizing to far-field location (θ, ϕ) or near-field location (θ, ϕ)). As an example, a lookup table that stores a set of HRTF pairs includes a field/column that specifies the coordinates associated with each pair, and the coordinates indicate the location for the origination of the sound. These coordinates include a distance (r) or near-field or far-field designation, an azimuth angle (θ), and/or an elevation angle (ϕ).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener as the customized HRTFs.

A HRTF is a function of frequency (f) and three spatial variables, by way of example (r, θ, ϕ) in a spherical coordinate system. Here, r is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and ϕ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the origination point of a sound, the sound attenuates inversely with the distance. One meter or thereabout defines a practical boundary between near-field and far-field distances and corresponding HRTFs. A "near-field" distance is one measured at about one meter or less; whereas a "far-field" distance is one measured at about one meter or more. Example embodiments are implemented with near-field and far-field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The coordinates (r, θ, ϕ) for external sound localization can also be calculated from a measurement of an orientation of and a distance to the face of the person when a head related impulse response (HRIR) is captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). The data can include one or more of time domain impulse responses (FIR filter coefficients), filter feedback coefficients, and an ITD value. This information can also be referred to as "a" and "b" coefficients. By way of example, these coefficients are stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. The data can be arranged according to one or more standard or proprietary file formats, such as AES69, and extracted from the file.

The coordinates and other HRTF information can be calculated or extracted from the HRTF data files. A unique set of HRTF information (including r, θ, ϕ) is determined for each unique HRTF. These coordinates provide the location of the SLP and hence can be used to track the SLP and know its location.

The coordinates and other HRTF information are also stored in and retrieved from memory, such as storing the information in a look-up table. The information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person (e.g., when the sound is provided as mono sound or stereo sound). Sound can also switch between externally localizing and internally localizing, such as appearing to move and pass through a head of a listener.

SLI can also be approximated or interpolated based on known data or known SLI, such as SLI for other coordinate locations. For example, a SLP is desired to localize at coordinate location (2.0 m, 0°, 40°), but HRTFs for the location are not known. HRTFs are known for two neighboring locations, such as known for (2.0 m, 0°, 35°) and (2.0 m, 0°, 45°), and the HRTFs for the desired location of (2.0 m, 0°, 40°) are approximated from the two known locations. These approximated HRTFs are provided to convolve sound to localize at the desired coordinate location (2.0 m, 0°, 40°).

Sound is convolved either directly in the time domain with a finite impulse response (FIR) filter or with a Fast Fourier Transform (FFT). For example, an electronic device convolves the sound to one or more SLPs using a set of HRTFs, HRIRs, BRIRs, or RIRs and provides the person with binaural sound.

In an example embodiment, convolution involves an audio input signal and one or more impulse responses of a sound originating from various positions with respect to the listener. The input signal is a limited length audio signal (such as a pre-recorded digital audio file or sound clip) or an ongoing audio signal (such as sound from a microphone or streaming audio over the Internet from a continuous source). The impulse responses are a set of HRIRs, BRIRs, RIRs, etc.

Convolution applies one or more FIR filters to the input signals and convolves the input signals into binaural audio output or binaural stereo tracks. For example, the input signals are convolved into binaural audio output that is specific or individualized for the listener based on one or more of the impulse responses to the listener.

The FIR filters are derived binaural impulse responses. Alternatively, or additionally, the FIR filters are obtained from another source, such as generated from a computer simulation or estimation, generated from a dummy head, retrieved from storage, computed based on known impulse responses captured from people, etc. Further, convolution of an input signal into binaural output can include sound with one or more of reverberation, single echoes, frequency coloring, and spatial impression.

Processing of the sound also includes calculating and/or adjusting an interaural time difference (ITD), an interaural level difference (ILD), and/or other aspects of the sound in order to alter the cues and artificially alter the point of localization. Consider an example in which the ITD is calculated for a location (θ, ϕ) with discrete Fourier transforms (DFTs) calculated for the left and right ears. The ITD is located at the point for which the function attains its maximum value, known as the argument of the maximum or arg max as follows:

$$ITD = \text{argmax}(\tau)\sum_{n} d_{l,\theta,\phi}(n)\cdot d_{r,\theta,\phi}(n+\tau).$$

Subsequent sounds are filtered with the left HRTF, right HRTF, and/or ITD so that the sound localizes at (r, θ, ϕ). Such sounds include filtering stereo and monaural sound to localize at (r, θ, ϕ). For example, given an input signal as a monaural sound signal s(n), this sound is convolved to appear at (θ, ϕ) when the left ear is presented with:

$$s_l(n) = s(n - ITD)\cdot d_{l,\theta,\phi}(n);$$

and the right ear is presented with:

$$s_r(n) = s(n)\cdot d_{r,\theta,\phi}(n).$$

Consider an example in which a dedicated digital signal processor (DSP) executes frequency domain processing to generate real-time convolution of monophonic sound to binaural sound.

By way of example, a continuous audio input signal x(t) is convolved with a linear filter of an impulse response h(t) to generate an output signal y(t) as follows:

$$y(\tau) = x(\tau)\cdot h(\tau) = \int_{0}^{\infty} x(\tau - t)\cdot h(t)\cdot dt.$$

This reduces to a summation when the impulse response has a given length N and the input signal and the impulse response are sampled at t=iDt as follows:

$$y(i) = \sum_{j=0}^{N-1} x(i-j)\cdot h(j).$$

Execution time of convolution further reduces with a Fast Fourier Transform (FFT) algorithm and/or Inverse Fast Fourier Transform (IFFT) algorithm.

Consider another example of binaural synthesis in which recorded or synthesized sound is filtered with a binaural impulse response (e.g., HRIR or BRIR) to generate a binaural output sound to the person. The input sound is preprocessed to generate left and right audio streams that are mapped to one or more sound sources or sound localization points (known as SLPs). These streams are convolved with a binaural impulse response for the left ear and the right ear to generate the left and right binaural output sound signal. The output sound signal is further processed depending on a final destination. For example, a cross-talk cancellation algorithm is applied to the output sound signal when it will be provided through loudspeakers or applying artificial binaural reverberation to provide 3D spatial context to the sound.

The HRTFs can be generic HRTFs, customized HRTFs, or HRTFs that are customized to the listener. Customized HRTFs or HRTFs that are customized to the listener are specific to an anatomy of a particular listener and are based on a size and/or shape of the head and/or ears of the listener. Customized HRTFs can be obtained from actual measurements (e.g., measuring HRIRs and/or BRIRs from a head of the user) or from computational modeling (e.g., modeled from a photo of the user or modeled from measurements or approximations of the listener, such as a size and/or shape of the listener's head or ears). Customized HRTFs are also known as individualized HRTFs.

Generic HRTFs are not specific to an anatomy of the listener. Generic HRTFs can be obtained from actual measurements (e.g., measuring HRIRs and/or BRIRs from a head of the user or a dummy head) or from computation modeling. Generic HRTFs can work for a large group of people since these HRTFs are not customized or individualized to each person. These HRTFs are often stored in public databases and available to the generally public to use free of charge. One or more example embodiments expedite playing of sound to a user by prefetching, decrypting, and/or caching the sound before the sound is played to the listener in accordance with an example embodiment.

For example, an electronic device receives or obtains the sound from local memory (e.g., memory on the electronic device), local storage (e.g., memory directly attached to the electronic device), remote storage (e.g., memory accessed over the Ethernet or wireless network), a server, a database, a data center, etc.

When sound is already convolved into binaural sound, this sound can be converted back into mono or stereo sound or played as mono or stereo sound. For example, the electronic device plays the sound through a single speaker. As another example, the electronic device plays the same channel through both speakers (e.g., play the left channel sound to both the left and right speakers of the headphones or play the right channel sound to both the left and right speakers of the headphones). As another example, the sound is filtered through cross-talk canceling filters. Filters, for example, can eliminate crosstalk and the HRTFs (e.g., by utilizing an inverse filter, such as a Nelson/Kirkeby inverse filter).

FIGS. 2A-2E show an electronic device that provides a location and/or direction of a sound localization point (SLP) of binaural sound and/or image that is outside a field of view (FOV) in accordance with an example embodiment.

An electronic device 200 includes a display 210 that displays or provides objects, such as images, video, AR and/or VR graphical representations, etc. For illustration, the display 210 shows a field of view that includes a cabinet 220 and a person 230.

Figure 2A:
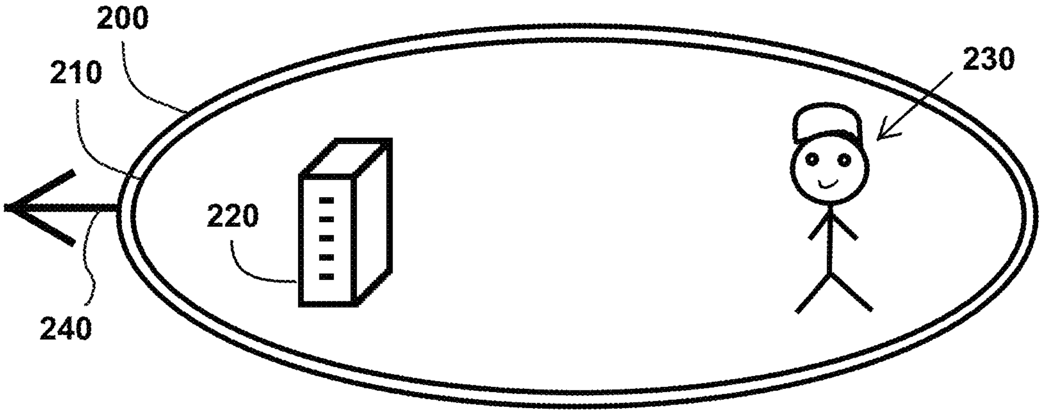
FIGS. 2A-2E show an electronic device that provides a location and/or direction of a sound localization point (SLP) of binaural sound and/or image that is outside a field of view (FOV) in accordance with an example embodiment.

FIG. 2A shows the electronic device 200 moving to the left, as shown with arrow 240. As such, objects viewable in, on, or thru the display move to the right with respect to the field of view of the display. When the electronic device 200 rotates sufficiently to the left in the direction of arrow 240, the person 230 is no longer visible in, on, or thru the display as shown in FIG. 2B.

Figure 2B:
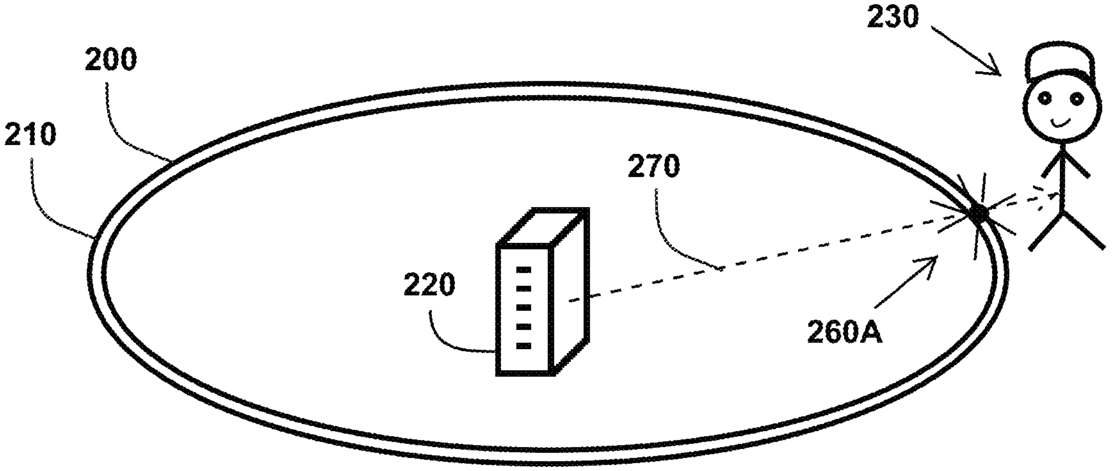

FIG. 2B shows the situation after the person 230 moved outside the field of view of the display 210. When this occurs, the user may no longer know where the object and/or SLP exists relative to the display since the object and/or SLP (here, a person 230) is no longer visible. In response to this occurrence, the display 210 provides an image or visual indication 260A-260D notifying the user that the person 230 is outside the field of view of the display and a location of this person.

The visual indication provides location information that includes a location and/or direction of where the object (here a person 230) exists outside of the field of view of the display. The visual indication is not the source of sound but is a visual indication for a direction and/or location where the source of sound is located. In this example, the source of sound occurs at the SLP that is the person 230 located outside the FOV of the listener.

In FIGS. 2B-2E, the user is not able to see the image 230 since it is outside the FOV. The user can hear 3D or binaural sound emanating from the location of the image 230 if the image is generating sound and within an audible distance. Here, the SLP for binaural sound of the image 230 occurs outside the current FOV for the user. As explained herein, example embodiments assist the listener (e.g., viewer of the display) in knowing a location and/or direction of the image when the image is generating binaural sound and when the image is not generating binaural sound.

As shown in FIG. 2B, the visual indication 260A is shown as a light that occurs on the edge or periphery of the display at a location that shows the user where to look or where to move the display to recapture the person 230. When the user moves his or her head and/or electronic device in the direction of imaginary line 270 (which is toward the light), the person 230 will reappear in the display since this movement changes the FOV to include the location of the person.

Figure 2C:
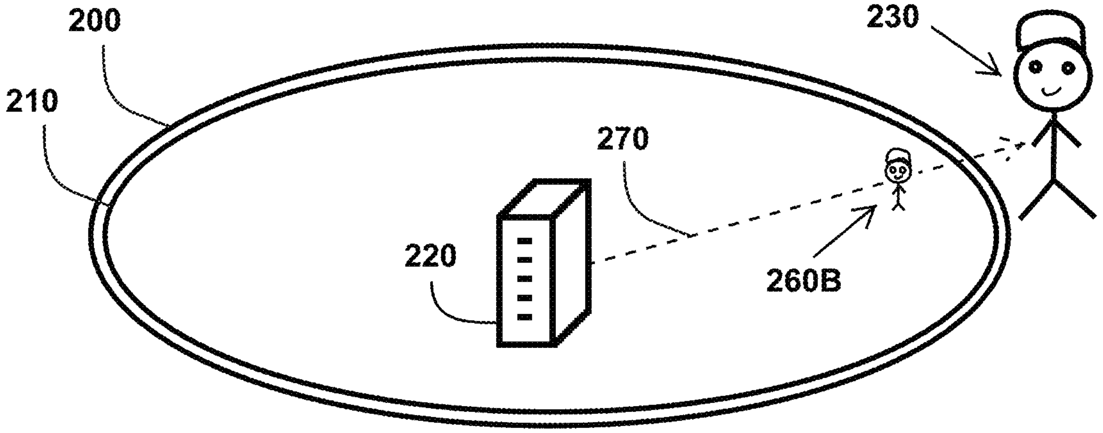

As shown in FIG. 2C, the visual indication 260B is shown as a smaller version of the person 230. For example, this smaller version imitates, emulates, copies, replicates, or approximates the person. The visual indication provides an image that the user recognizes as representing the person. The visual indication 260B occurs on the edge or periphery of the display at a location that shows the user where to look or where to move the display to recapture the person 230. When the user moves his or her head and/or electronic device in the direction of imaginary line 270, the person 230 will reappear in the display since this movement changes the FOV to include the location of the person.

Figure 2D:
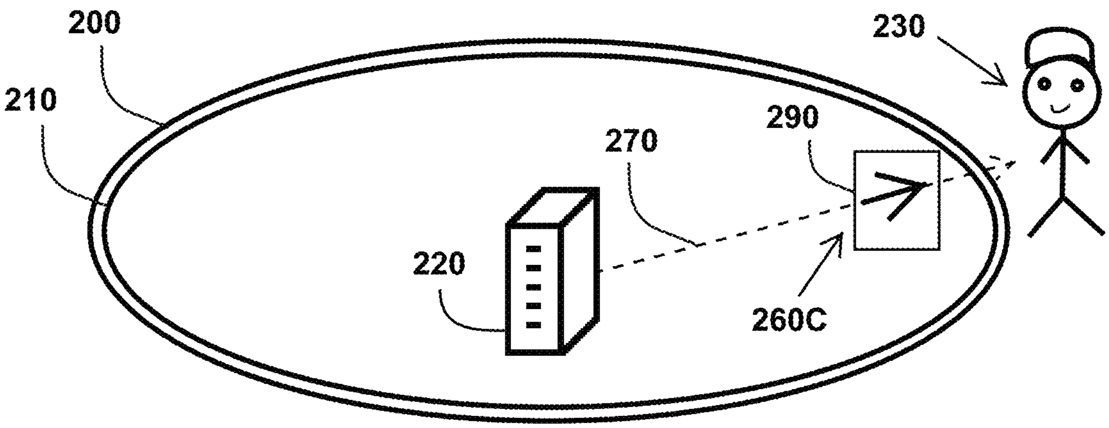

As shown in FIG. 2D, the visual indication 260C is shown as an arrow the points to the location of the person 230 outside the FOV. The arrow can be visually distinguished from other objects in the FOV (e.g., other objects being displayed or provided in the environment being viewed). For example, the arrow is provided with a different or unique color, shading, brightness, shape, etc. As another example, a box or window 290 is formed around the arrow to indicate that the arrow is displayed for location and/or directional information to the person 230. When the user moves his or her head and/or electronic device in the direction of arrow, the person 230 will reappear in the display since this movement changes the FOV to include the location of the person.

Figure 2E:
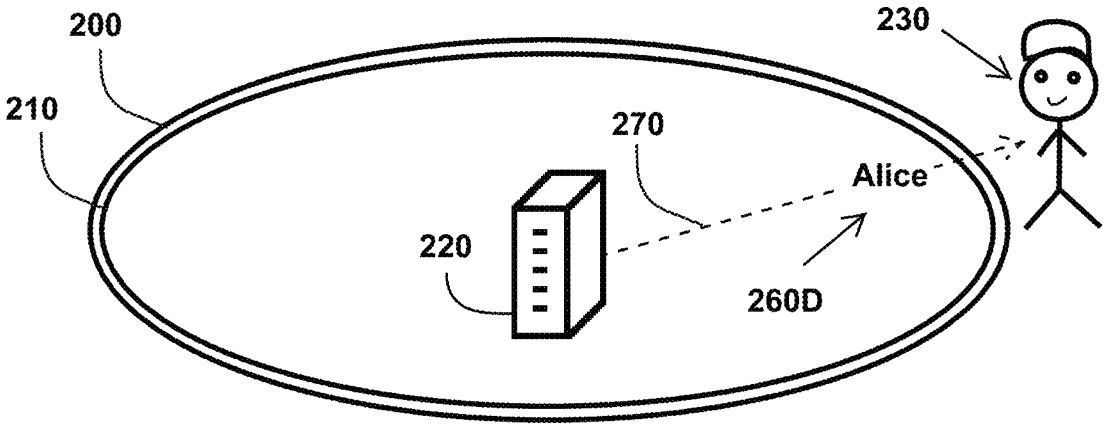

As shown in FIG. 2E, the visual indication 260D is shown as the name "Alice" to provide the location of the person 230 outside the FOV (e.g., the person 230 is named Alice). This visual indication indicates that Alice is located to a right of the current FOV being displayed. When the user moves his or her head and/or electronic device in the direction of the word Alice, the person 230 will reappear in the display since this movement changes the FOV to include the location of Alice.

Figure 3A:
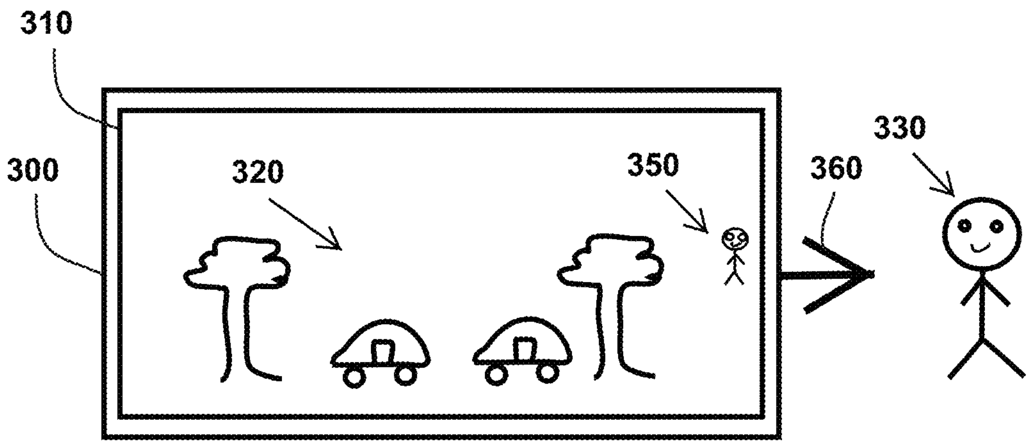
FIGS. 3A-3B show an electronic device that provides a location and/or direction of a sound localization point (SLP) of binaural sound and/or image that is outside a field of view (FOV) in accordance with an example embodiment.
Figure 3B:
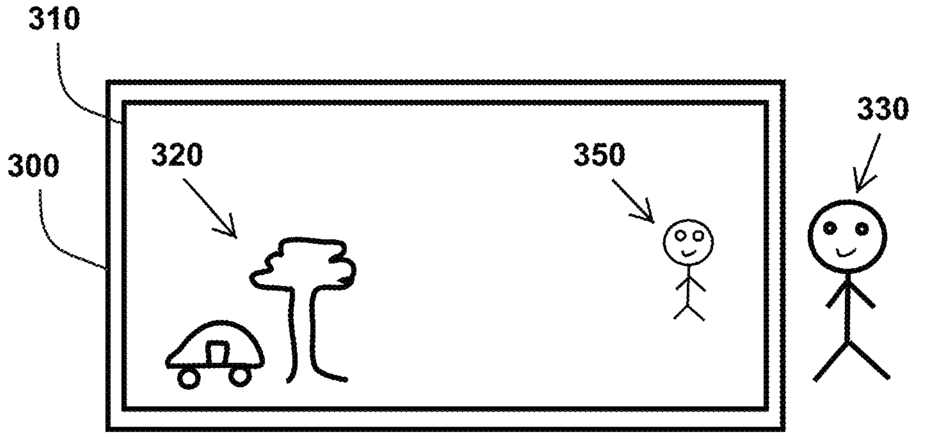

FIGS. 3A-3B show an electronic device that provides a location and/or direction of a sound localization point (SLP) of binaural sound and/or image that is outside a field of view (FOV) in accordance with an example embodiment.

An electronic device 300 includes a display 310 that displays or provides objects, such as images, video, AR and/or VR graphical representations, etc. For illustration, the display 310 shows a field of view with images or objects 320 that include two vehicles between two trees. An image 330 of a person is shown outside the FOV and hence not being displayed on the display 310. This image can be or include a SLP of binaural sound (e.g., the image represents a voice of a talking person that the listener hears).

The display 310 also includes a visual indication or an image 350 that represents or is associated with the image 330 outside the FOV. Image 350 is positioned near or at a perimeter of the display. A location of the image 350 within the display and FOV shows a corresponding location and/or direction of the image 330 that is outside the FOV and generating 3D or binaural sound.

The user is not able to see this image 330 since it is outside the FOV. The user can hear 3D or binaural sound emanating from the location of the image 330 if the image is generating sound and within an audible distance. Here, the SLP for binaural sound of the image 330 occurs outside the current FOV for the user. As explained herein, example embodiments assist the listener (e.g., viewer of the display) in knowing a location and/or direction of the image when the image is generating binaural sound and when the image is not generating binaural sound.

FIG. 3A shows the electronic device, display, and/or FOV moving to the right toward the image 330 as shown with arrow 360. As such, objects 320 viewable in, on, or thru the display move toward the left side of the display or left side of the field of view of the display. At the same time, movement in this direction brings the image 330 closer to the FOV of the display.

FIG. 3B shows the electronic device, display, and/or FOV after being moved to the right toward the image 330. Since the FOV changed, some objects 320 are no longer visible in the FOV (e.g., one of the cars and one of the trees no longer appear in the FOV and hence are not displayed).

A size of the image 350 increases and decreases corresponding to the distance that the image 330 is outside the FOV. As the image 330 becomes farther away from the FOV (e.g., an edge of the FOV), a size of the image 350 decreases. As the image 330 becomes closer to the FOV, the size of the image 350 increases. This change in size visually notifies the user about how far away the image 330 is from the currently displayed FOV. FIG. 3B shows image 350 being larger than image 350 in FIG. 3A because the FOV is closer to capturing or including the image 330.

Changing a size of image 350 provides the user with visual information about how far outside a FOV an object is located. A size of the image being displayed changes as the distance from an edge of the FOV changes (e.g., increases or decreases). As the image becomes larger and larger, the user can see that the object and/or SLP is moving closer toward the FOV of the electronic device and/or user. By contrast, as the image becomes smaller and smaller, the user can see that the object and/or SLP is moving farther away from the FOV of the electronic device and/or user.

Figure 4A:
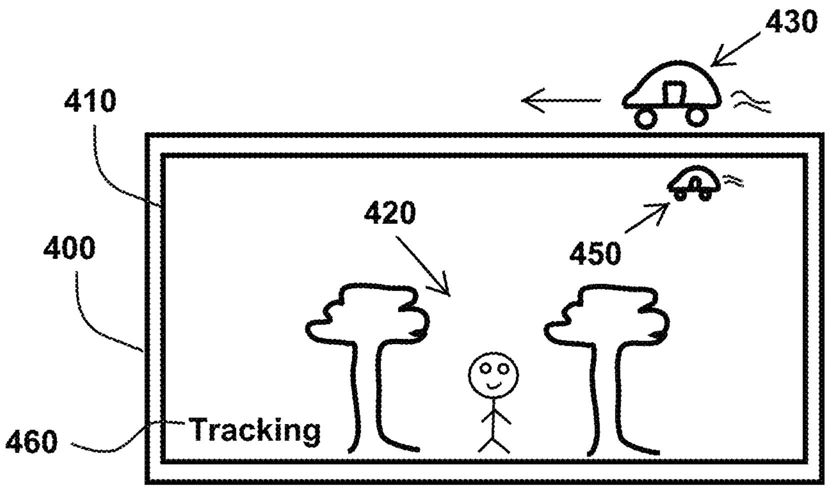
FIGS. 4A-4B show an electronic device that provides a location and/or direction of a sound localization point (SLP) of binaural sound and/or image that is outside a field of view (FOV) in accordance with an example embodiment.
Figure 4B:
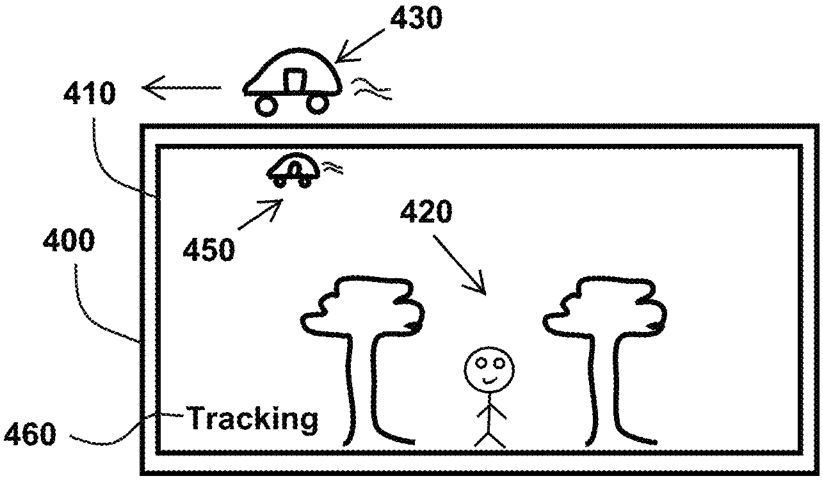

FIGS. 4A-4B show an electronic device that provides a location and/or direction of a sound localization point (SLP) of binaural sound and/or image that is outside a field of view (FOV) in accordance with an example embodiment.

An electronic device 400 includes a display 410 that displays or provides objects, such as images, video, AR and/or VR graphical representations, etc. For illustration, the display 410 shows a field of view with images or objects 420 that include a person standing between two trees. An image 430 of a moving car is shown outside the FOV and hence not being displayed on the display 410. This image can be or include a SLP of binaural sound (e.g., the image generates sounds of a moving car in 3D sound that the user hears but does not see).

The display 410 also includes a visual indication or an image 450 that represents or is associated with the image 430 outside the FOV. Image 450 is positioned near or at a perimeter of the display. A location of the image 450 within the display and FOV shows a corresponding location and/or direction of the image 430 that is outside the FOV and generating the 3D or binaural sound.

FIG. 4A shows the image 430 outside the FOV is moving and changing its location with respect to the current FOV of the display 410 and/or user (e.g., person viewing the display). For example, the electronic device 400 and display 410 do not move, and the FOV remains unchanged.

The user is not able to see this image 430 since it is outside the FOV. The user can hear 3D or binaural sound emanating from the location of the image 430 if the image is generating sound and within an audible distance. Here, the SLP for binaural sound of the image 430 occurs outside the current FOV for the user. As explained herein, example embodiments assist the listener (e.g., viewer of the display) in knowing a location and/or direction of the image when the image is generating binaural sound and when the image is not generating binaural sound.

FIG. 4B shows the image 450 tracking and following movement of the image 430 outside the FOV. In this way, the user has real time, current information regarding the location and/or direction of the image 430 as it moves outside the FOV. The user can quickly locate the image 430 since the image 450 continues to change its location in the FOV to show the user where the image 430 is currently located.

FIGS. 4A and 4B display "tracking" is enabled and active at 460. This information signifies to the user that the electronic device is currently tracking the location of the image 430 that is currently outside the FOV of the display. This information can also signify that the direction and/or location of this image is being displayed (e.g., displayed with image 450). The user can interact with a user interface to activate and/or deactivate tracking of the image outside the FOV and/or displaying of the image showing the location and/or direction of the image outside the FOV.

The position of the visual indication can appear in various locations of the display to indicate the location and/or direction of the corresponding hidden object and/or SLP. For example, if the visual indication appeared at the top of the display, then this position would indicate to the user that the object and/or SLP is above the display. If the visual indication appeared at the bottom of the display, then this position would indicate to the user that the object and/or SLP is below the display.

Figure 5:
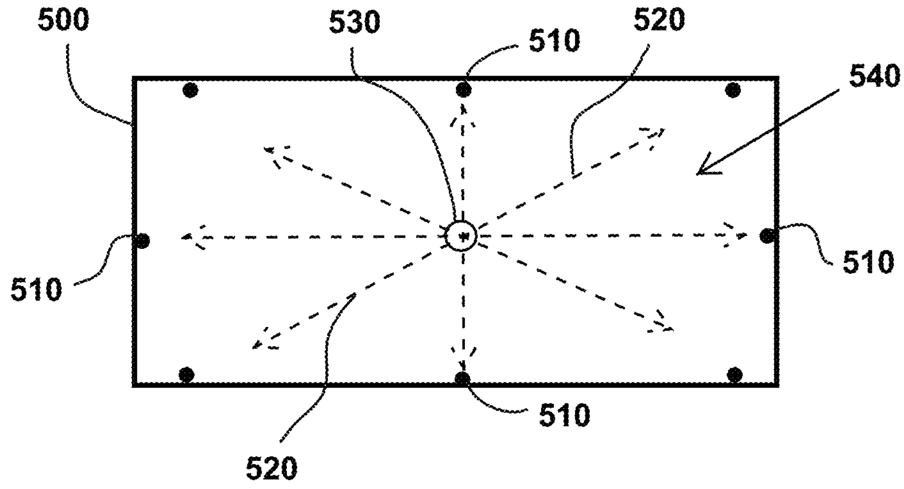
FIG. 5 shows a field of view (FOV) that includes a plurality of visual indications that show locations of sources of binaural sound in accordance with an example embodiment.

FIG. 5 shows a field of view (FOV) 500 that includes a plurality of visual indications 510 that show locations of sources of binaural sound in accordance with an example embodiment. These sources of binaural sound can be outside the FOV or inside the FOV (e.g., obscured or not visible).

Imaginary lines 520 radiate outward from an origin 530 and show a direction where the source of binaural sound is located. The lines extend thru or to the visual indications that show the direction or location of binaural sound.

The origin 530 can be a center of the FOV. Alternatively, the origin can be the location of the listener. For example, this location represents where the listener is located in a VR environment.

In an example embodiment, the imaginary lines 520 are not visible to the user but show the direction of where the user and/or electronic device will move toward the associated visual indication. Movement in this direction is toward the location of the binaural sound.

In an example embodiment, the imaginary lines 520 are visible to the user to assist him or her in locating the source of the binaural sound. For example, the lines flash or appear when the location of the binaural sound is requested, desired, or needed.

The visual indication can also appear as a 2D or 3D area or region on, in, or thru the display. For example, an area 540 between two imaginary lines is highlighted, colored, or shaded. This area indicates a location and/or direction of the source of binaural sound.

Figure 6:
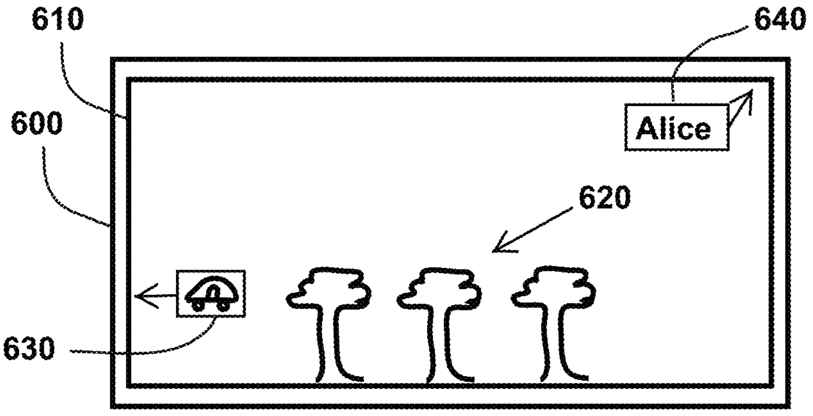
FIG. 6 is an electronic device with a display that simultaneously displays multiple locations of binaural sound outside a FOV of a user in accordance with an example embodiment.

FIG. 6 is an electronic device 600 with a display 610 that simultaneously displays multiple locations of binaural sound outside a FOV of a user in accordance with an example embodiment.

The display 610 includes several objects or images 620, a first visual indication 630 showing a location of binaural sound, and a second visual indication 640 showing a location of binaural sound.

The display 610 can simultaneously display multiple visual indications to indicate locations of multiple sources of sound (e.g., multiple SLPs) that are out of the current FOV or not visible in the current FOV. In this way, the user can track locations of multiple objects that are no longer visible but may or may not be generating sound.

Consider an example in which electronic device 600 is an HMD that displays three VR trees 620 to a user or wearer of the HMD. In addition to seeing the VR trees, the user of the HMD hears several sounds but cannot see images for the objects making these sounds. One of these sounds is a car driving, and another one of these sounds is a voice of a person named Alice. The user hears these sounds as binaural sound so he or she can externally localize their direction, but the user cannot see them. In the frame of reference or FOV of the user, the car is located to a left of the user, and the voice of Alice is located up and to the right.

In order to assist the user in tracking the location of these binaural sounds, the display 610 shows visual indications 630 and 640.

Visual indication 630 is an image of 3D car with an arrow showing direction of movement. The binaural sound of the car that the listener hear does not originate from the visual indication 630 because the car is located outside the FOV of the user. Instead, the visual indication 630 is displayed to assist the user in knowing or tracking where the location of the car is with respect to the current FOV. The virtual car making the sound, for instance, may be far outside the FOV and away from the user. The visual indication 630 shows the user where to look to see the car or what direction the car is located with respect to the current FOV of the user.

Visual indication 640 is an image of the word "Alice" with a box and arrow. The box informs the listener that information inside is directional or locational information for a 3D source of sound outside the FOV. The arrow assists in showing a direction for this source of sound. In this example, the source of sound is a person named Alice. If the user wanted to bring the source of sound or SLP of Alice into the FOV, then the user would move his or her head upward and to the right as indicated by the arrow extending from the box or window surrounding the name.

Figure 7:
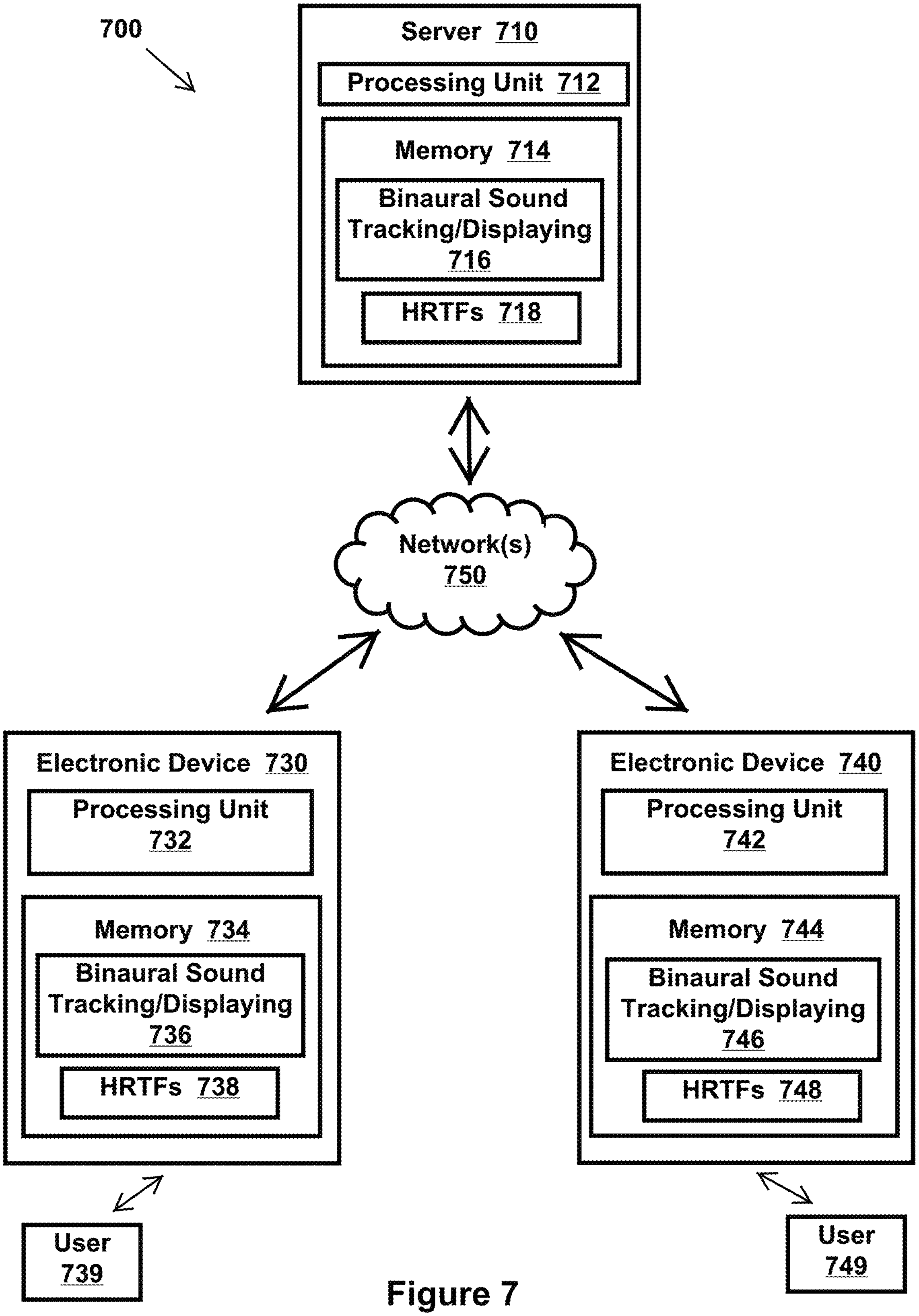
FIG. 7 is an example computer system in accordance with an example embodiment.

FIG. 7 is an example computer system 700 in accordance with an example embodiment.

The computer system 700 includes one or more of a server 710, an electronic device 730, and an electronic device 740 in communication over one or more networks 750. User 739 is with or uses electronic device 730, and user 749 is with or uses electronic device 740. For illustration, a single server 710, two electronic devices 730 and 740, and two users 739 and 749 are shown, but example embodiments can include one or more of a server, electronic device, and user.

Server 710 includes a processing unit 712 and memory 714. The memory includes binaural sound tracking and/or displaying 716 (e.g., software and/or hardware to execute examples embodiments that track and/or display direction and/or location to binaural sound) and HRTFs 718.

Electronic device 730 includes a processing unit 732 and memory 734 with binaural sound tracking and/or displaying 736 and HRTFs 738.

Electronic device 740 includes a processing unit 742 and memory 744 with binaural sound tracking and/or displaying 746 and HRTFs 748.

Binaural sound tracking and/or displaying can occur in the server, in one of the electronic devices, or in combinations of these devices.

Figure 8:
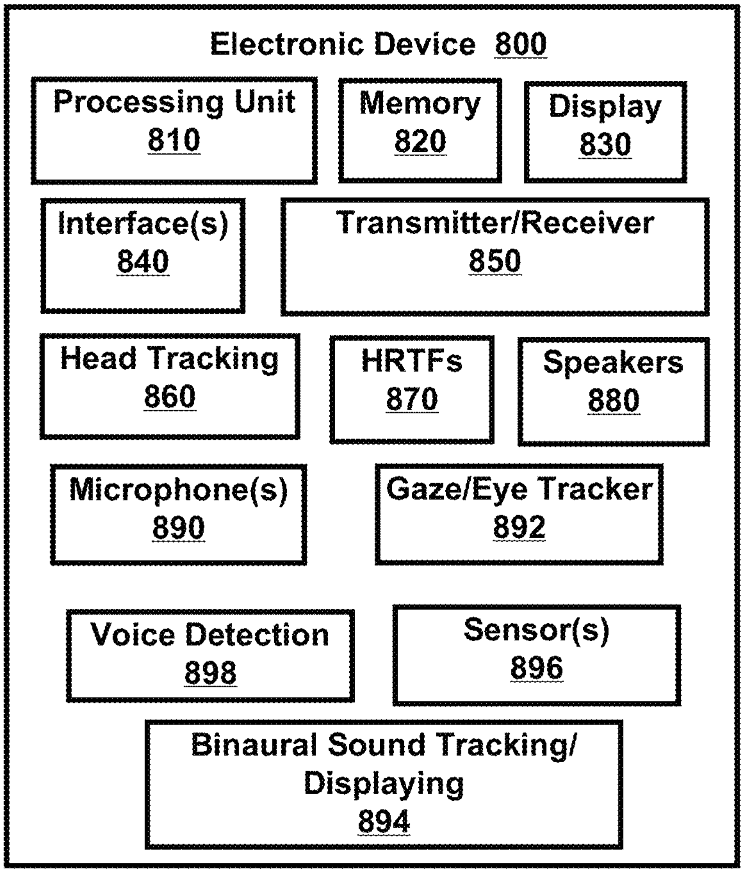
FIG. 8 is an example of an electronic device in accordance with an example embodiment.

FIG. 8 is an example of an electronic device 800 in accordance with an example embodiment.

The electronic device 800 includes a processor or processing unit 810, memory 820, a display 830, one or more interfaces 840, a wireless transmitter/receiver 850, head tracking 860 (such as one or more of an inertial sensor, accelerometer, gyroscope, and magnetometer), HRTFs 870, speakers 880, one or more microphones 890, gaze and/or eye tracker 892, binaural sound tracking and/or displaying 894, one or more sensors 896 (such as one or more of a proximity sensor, infrared sensor, and camera), and a voice detection and/or voice recognition 898.

Memory includes computer readable medium (CRM).

Examples of an interface include, but are not limited to, a network interface, a graphical user interface, a natural language user interface, a natural user interface, a phone control interface, a reality user interface, a kinetic user interface, a touchless user interface, an augmented reality user interface, and/or an interface that combines reality and virtuality.

The processor or processing unit includes a processor and/or a digital signal processor (DSP). For example, the processing unit includes one or more of a central processing unit, CPU, digital signal processor (DSP), microprocessor, microcontrollers, field programmable gate arrays (FPGA), application-specific integrated circuits (ASIC), etc. for controlling the overall operation of memory (such as random access memory (RAM) for temporary data storage, read only memory (ROM) for permanent data storage, and firmware).

Consider an example embodiment in which the processing unit includes both a processor and DSP that communicate with each other and memory and perform operations and tasks that implement one or more blocks of the flow diagram discussed herein. The memory, for example, stores applications, data, programs, sound clips, algorithms (including software to implement or assist in implementing example embodiments) and other data.

For example, a processor or DSP executes a convolving process with the retrieved HRTFs or HRIRs (or other transfer functions or impulse responses) to process sound clips so that the sound is adjusted, placed, or localized for a listener away from but proximate to the head of the listener. For example, the DSP converts mono or stereo sound to binaural sound so this binaural sound externally localizes to the user. The DSP can also receive binaural sound and move its localization point, add or remove impulse responses (such as RIRs), and perform other functions.

For example, an electronic device or software program convolves and/or processes the sound captured at the microphones of an electronic device and provides this convolved sound to the listener so the listener can localize the sound and hear it. The listener can experience a resulting localization externally (such as at a sound localization point (SLP) associated with near field HRTFs and far field HRTFs) or internally (such as monaural sound or stereo sound).

The memory stores HRTFs, HRIRs, BRTFs, BRIRs, RTFs, RIRs, or other transfer functions and/or impulse responses for processing and/or convolving sound. The memory can also store instructions for executing one or more example embodiments. Further, the memory can store the sound, graphical representations, and other information and instructions discussed herein (e.g., sound switching). The memory can also store coordinate locations and head movements used to determine the location of the binaural sound and the location for the visual indication of this sound on the display.

The electronic device provides sound to the users through one or more speakers. Alternatively, or in addition to the speakers, the electronic device can communicate with headphones, earphones, earbuds, bone conduction devices, or another electronic device that provides sound to the user.

The networks include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

By way of example, a computer and an electronic device include, but are not limited to, handheld portable electronic devices (HPEDs), wearable electronic glasses, electronic or smart watches, wearable electronic devices (WEDs), smart earphones or hearables, electronic devices with cellular or mobile phone capabilities or subscriber identification module (SIM) cards, desktop computers, servers, portable computers (such as tablet and notebook computers), smartphones, head mounted displays (HMDs), optical head mounted displays (OHMDs), headphones, and other electronic devices with a processor or processing unit, a memory, and/or a DSP.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Example embodiments can be executed with one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments (e.g., tracking the location and/or direction of binaural sound and displaying this location and/or direction on a display).

Consider an example in which the HPED (including headphones) includes a customized or dedicated DSP that executes one or more blocks discussed herein (including processing and/or convolving sound into binaural sound for sound clips). Such a DSP has a better power performance or power efficiency compared to a general-purpose microprocessor and is more suitable for a HPED or WED due to power consumption constraints of the HPED or WED. The DSP can also include a specialized hardware architecture, such as a special or specialized memory architecture to simultaneously fetch or pre-fetch multiple data and/or instructions concurrently to increase execution speed and sound processing efficiency and to quickly correct errors while sound externally localizes to the user. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller. The DSP can also prefetch sound clips and other sound from memory to expedite convolution.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

As used herein, "empty space" is a location that is not occupied by a tangible object.

As used herein, "field-of-view" or "FOV" is the observable area a person can see with his or her eyes or with an electronic device (e.g., a person wearing electronic glasses, HMD, etc.).

As used herein, "graphical representations" include, but are not limited to, emoji, emoticons, animoji, icons, stickers, folders, documents, files, text or words, pictures, pictograms, ideograms, holograms, images, and other visible indicia that display on, thru, or with an electronic device. Furthermore, these graphical representations can be two-dimensional (2D), three-dimensional (3D), virtual reality (VR) images, augmented reality (AR) images, static or non-moving, moving, and other types of images.

As used herein, "headphones" or "earphones" include a left and right over-ear ear cup, on-ear pad, or in-ear monitor (IEM) with one or more speakers or drivers for a left and a right ear of a wearer. The left and right cup, pad, or IEM may be connected with a band, connector, wire, or housing, or one or both cups, pads, or IEMs may operate wirelessly being unconnected to the other. The drivers may rest on, in, or around the ears of the wearer, or mounted near the ears without touching the ears.

As used herein, the word "proximate" means near. For example, binaural sound that externally localizes away from but proximate to a user localizes within three meters of the head of the user.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "sound localization information" or "SLI" is information that is used to process or convolve sound so the sound externally localizes as binaural sound to a listener.

As used herein, a "telephone call," or a "electronic call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears or about six inches apart).

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

What is claimed is:

1. A method comprising:

displaying, with electronic glasses during an electronic call between a first person and a second person, a virtual image of the second person in a field of view (FOV) of the first person wearing the electronic glasses; and displaying, with the electronic glasses during the electronic call between the first person and the second person, a smaller version of the second person at a periphery of the FOV of the first person in response to head movement of the first person causing the virtual image of the second person to move outside the FOV of the first person.

2. The method of claim 1 further comprising:

removing, with the electronic glasses during the electronic call between the first person and the second person, the smaller version of the second person being displayed at the periphery of the FOV in response to the head movement of the first person causing the virtual image of the second person to move back into the FOV of the first person.

3. The method of claim 1 further comprising:

displaying, with the electronic glasses during the electronic call between the first person and the second person, the smaller version of the second person at the periphery of the FOV inside a virtual window.

4. The method of claim 1 further comprising:

displaying, with the electronic glasses during the electronic call between the first person and the second person, the smaller version of the second person at a location at the periphery of the FOV such that the location shows the first person where to look so the virtual image of the second person returns back in the FOV.

5. The method of claim 1 further comprising:

displaying, with the electronic glasses during the electronic call between the first person and the second person, the smaller version of the second person at the periphery of the FOV as a three-dimensional (3D) virtual image that moves in real time with movements of the second person.

6. The method of claim 1 further comprising:

moving the smaller version of the second person along the periphery of the FOV as the electronic glasses move so the electronic glasses continue to display a direction where the virtual image of the second person exists outside the FOV.

7. The method of claim 1 further comprising:

processing a voice of the second person with head-related transfer functions (HRTFs) such that the voice of the second person originates to the first person at a location of the virtual image of the second person located outside the FOV while the electronic glasses displays the smaller version of the second person at the periphery of the FOV.

8. The method of claim 1 further comprising:

receiving, from the first person and at one or more microphones in the electronic glasses, a verbal command to show a location of the virtual image of the second person that moved outside the FOV; and displaying, in response to receiving the verbal command, the smaller version of the second person at the periphery of the FOV that shows a location where the virtual image of the second person exists outside the FOV.

9. Electronic glasses worn on a head of a wearer, the electronic glasses comprising:

a display that displays, during an electronic call between the wearer and a person, a virtual image of the person in a field of view (FOV) of the electronic glasses; and speakers that play, during the electronic call, a voice of the person, wherein in response to the electronic glasses determining the virtual image of the person moves outside the FOV, the display displays a reduced size of the virtual image of the person at a location at a perimeter of the FOV.

10. The electronic glasses of claim 9, wherein the location at the perimeter of the FOV provides the wearer a direction where to look to move the FOV to include the virtual image of the person.

11. The electronic glasses of claim 9, wherein the display removes the reduced size of the virtual image of the person from the location at the perimeter of the FOV in response to the virtual image of the person moving back into the FOV of the electronic glasses.

12. The electronic glasses of claim 9, wherein the reduced size of the virtual image of the person at the location at the perimeter of the FOV disappears after a predetermined amount of time and reappears upon receiving a verbal instruction from the wearer.

13. The electronic glasses of claim 9, wherein the display displays the reduced size of the virtual image of the person at the location at the perimeter of the FOV inside a virtual window.

14. The electronic glasses of claim 9, wherein the reduced size of the virtual image of the person at the location at the perimeter of the FOV moves in real time to track movements of the person while the virtual image of the person is outside the FOV and while the wearer and the person are in the electronic call with each other.

15. The electronic glasses of claim 9, wherein the display displays the reduced size of the virtual image of the person as a three-dimensional augmented reality (AR) image that moves during the electronic call between the wearer and the person.

16. Electronic glasses worn on a head of a wearer, the electronic glasses comprising:

a display that displays, during an electronic call between the wearer and a person, a virtual image of the person in a field of view (FOV) of the electronic glasses, wherein the electronic glasses display a smaller version of the virtual image of the person at a periphery of the FOV in response to a head movement of the wearer that causes the virtual image of the person to move outside the FOV of the electronic glasses during the electronic call between the wearer and the person.

17. The electronic glasses of claim 16, wherein the smaller version of the virtual image of the person at the periphery of the FOV moves in real time with movements of the person during the electronic call between the wearer and the person while the virtual image of the person is located outside the FOV of the electronic glasses.

18. The electronic glasses of claim 16, wherein the smaller version of the virtual image of the person is located at a location at the periphery that shows the wearer in which direction to move the FOV to recapture the virtual image of the person located outside the FOV of the electronic glasses.

19. The electronic glasses of claim 16, wherein the display removes the smaller version of the virtual image of the person in response to the virtual image of the person moving back into the FOV of the electronic glasses.

20. The electronic glasses of claim 16, wherein the smaller version of the virtual image of the person is located at the periphery of the FOV along an imaginary line that extends from the electronic glasses to a location where the virtual image of the person exists outside the FOV of the electronic glasses.

* * * * *